R. W. & L. H. BATEMAN.
VISE.
APPLICATION FILED NOV. 20, 1911.
Reissued June 25, 1912.
13,431.
2 SHEETS—SHEET 1.
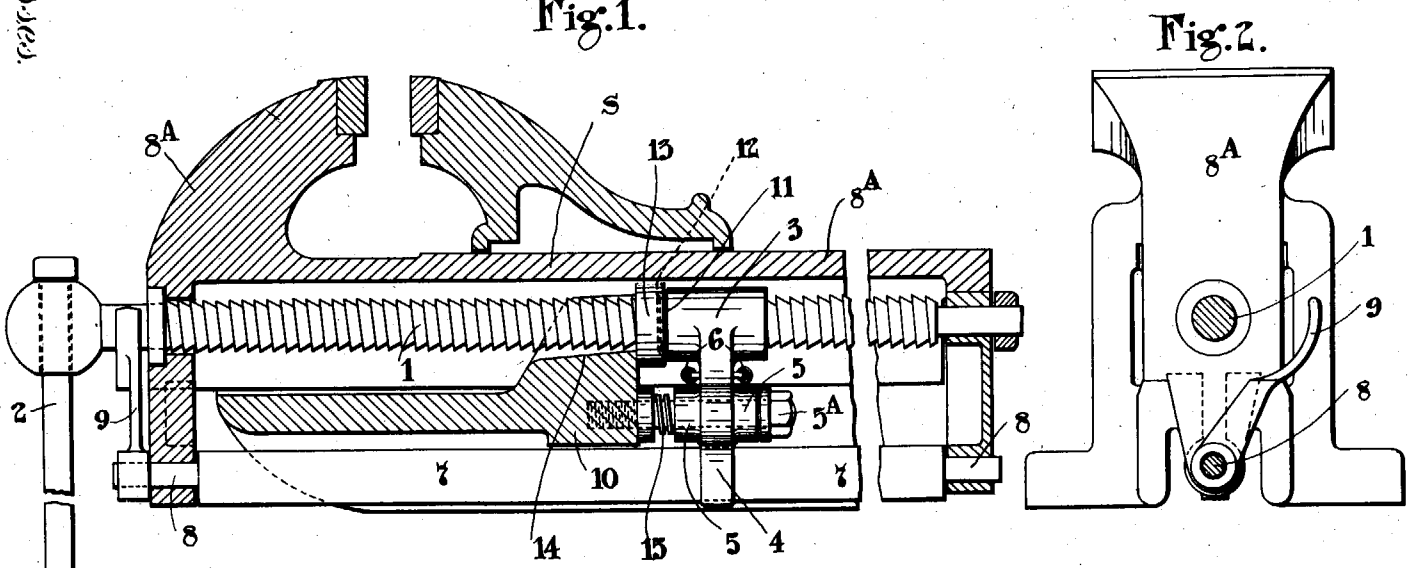
Witnesses.
C. E. Parsons
H. L. Alden
Inventors.
R. W. Bateman & L. H. Bateman
by Spear, Middleton, Donaldson & Spear Attorney.
COLUMBIA PLANOGRAPH CO., WASHINGTON, D. C.

R. W. & L. H. BATEMAN.

VISE.

APPLICATION FILED NOV. 20, 1911.

Reissued June 25, 1912.

13,431.

2 SHEETS—SHEET 2.

Witnesses.
C. E. Parsons
H. L. Alden

Inventors
R. W. Bateman & L. H. Bateman
By Spear, Middleton, Donaldson & Spear
Attorney.

COLUMBIA PLANOGRAPH CO., WASHINGTON, D. C.

UNITED STATES PATENT OFFICE.

RICHARD WILKINSON BATEMAN AND LOFTUS HANSON BATEMAN, OF LEEDS, ENGLAND.

VISE.

13,431. Specification of Reissued Letters Patent. Reissued June 25, 1912.

Original No. 1,002,486, dated September 5, 1911, Serial No. 588,978. Application for reissue filed November 20, 1911. Serial No. 661,395.

*To all whom it may concern:*

Be it known that we, RICHARD WILKINSON BATEMAN and LOFTUS HANSON BATEMAN, residing at 35 Hill Crest avenue, Leeds, in the county of York, England, have invented certain new and useful Improvements in Vises; and we do hereby declare the following to be a full, clear, and exact description of the invention, such as will enable others skilled in the art to which it appertains to make and use the same.

This invention relates to parallel vises of the class in which the nut is made in two portions or halves pivoted together and closed on the operating spindle or screw by a tilting bar or rod and normally closed by a spring and so brought into or out of mesh with the spindle or screw and in which when the nut and screw are disengaged the movable jaw of the vise can be rapidly slid up to the work or the jaw opened or closed and when so moved the nut and screw can be engaged and the jaw screwed tightly into position. The present invention is designed to achieve these desired results in a vise of extreme simplicity which can be produced at comparatively small cost, the invention comprising a divided nut closed by a spring and opened by an eccentrically mounted bar or rod, the divided nut, when closed, being held in this position owing to one of its ends being convex and engaging with a concave recess in the face of a disk or washer or in the face of a buttress, and when the jaws of the vise are relaxed, or the grip loosened, the dividing nut is slidable on its carrying stud and may be slid thereon by a spring, so that the convex end of the nut disengages from the concave recess gradually and easily.

Figure 4:
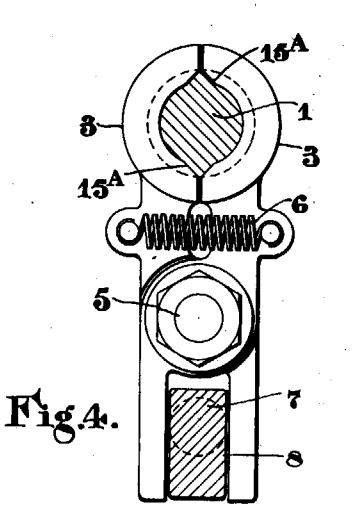
Figure 6:
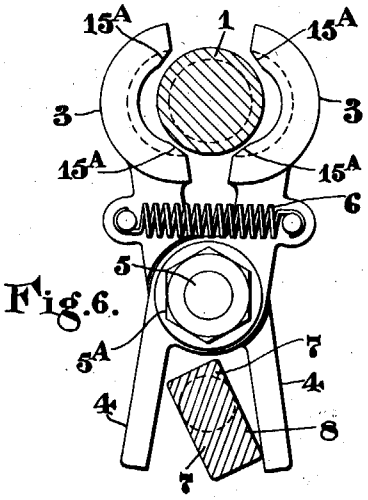
Figure 3:
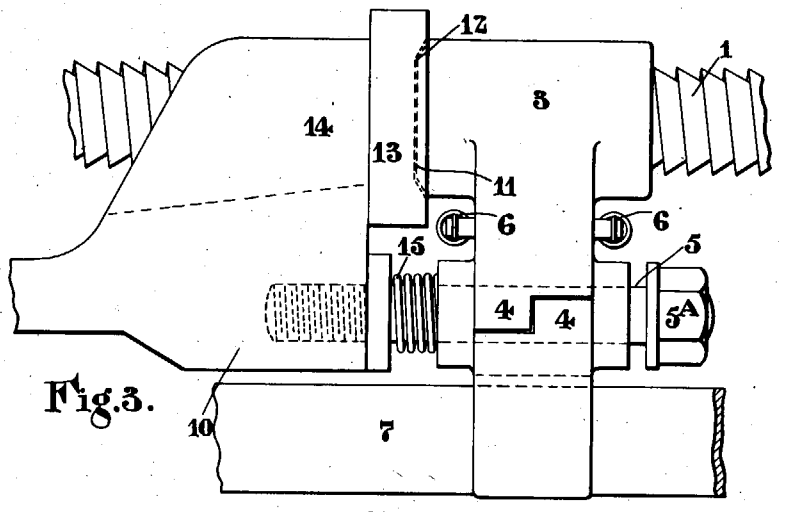
Figure 5:
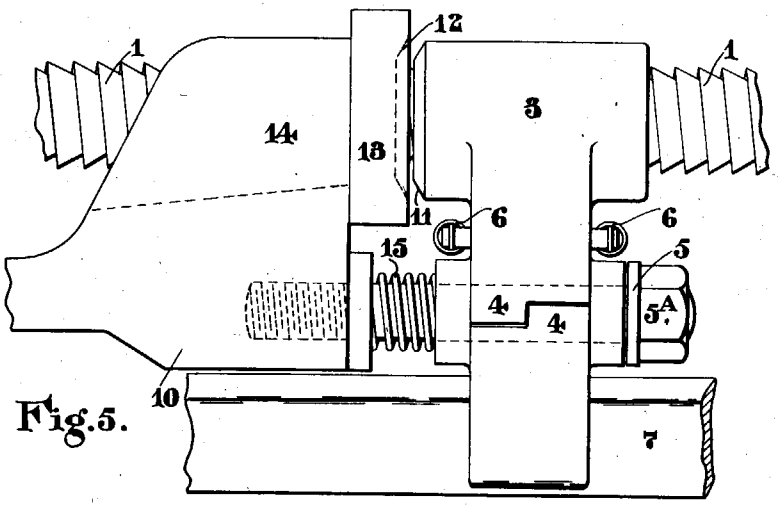

Referring to the drawings which form part of this specification:—Figure 1 is a sectional elevation of the vise made in accordance with the said invention. Fig. 2 is an end elevation of the vise with the operating handle removed. Fig. 3 is a view in elevation of part of the vise illustrating the divided nut in the closed position meshing with the operating screw and with its convex face engaging the concave recess, the jaws of the vise being closed or gripping the work. Fig. 4 is an end view in elevation of the divided nut closed. Fig. 5 is a similar view to Fig. 3 but showing the divided nut open and disengaged from the operating screw and concave recess, the jaws of the vise being open. Fig. 6 is an end view in elevation of the divided nut open.

According to this invention the operating spindle or screw 1 of the vise is mounted in fixed bearings and is rotated in either direction by handle 2 as ordinarily, The nut comprises two halves or portions 3 carried on rocking limbs or arms 4 mounted on a stud 5, after the manner of a pair of pliers. The portions 3—3 are slidable on the stud 5, the amount of movement being limited between the nut $5^A$ and the spring 15. The upper or nut ends 3—3 of the limbs or arms 4—4 are drawn together by a spring 6 (or springs) and when closed (see Figs. 3 and 4) the two halves or portions constitute a complete nut through which the screw passes. Between the lower or outer ends of the arms or limbs 4—4 there passes a tilting bar or rod 7 eccentrically mounted on its carrying studs 8—8 and operated or rocked by a thumb lever 9 or like device. When tilted or rocked the eccentric rod or bar 7 bears upon the lower or outer ends of the limbs or arms 4—4 and rocks them on the stud 5. The tension of the spring 6 is thus overcome and the two portions or halves of the nut 3 are separated or opened (see Fig. 6) and disengaged from the screw 1. On releasing the thumb lever 9 the spring tension closes the nut 3 and the latter meshes with the screw 1.

The studs 8—8 are supported in bearings or supports fixed or cast to the base or slide S of the movable jaw $8^A$ of the vise as shown in Figs. 1 and 2. The rod or bar 7, being eccentric, operates upon and actuates each limb or arm 4 equally, and each portion of the nut 3 moves or opens or closes through a like arc and disengages or engages the screw 1 with a minimum amount of movement.

The stud 5 carrying the limbs or arms 4—4 is fixed in the base piece 10 of the vise. The inner surface of the nut 3 is convex as at 11, and when the vise is closed or gripping the work, the concave face 12 of a washer 13 is interposed between the nut 3 and a buttress portion 14 of the vise. The convex and concave surfaces 11—12 when under pressure exert a closing tendency on the nut 3 which is thereby maintained in a closed position and for the time being is practically a solid or ordinary nut. When the jaws of the vise are relaxed or the grip of the vise loosened, the nut 3 will rebound or automatically release itself from the concavity of the washer, and in order that the disengagement may take place gradually or smoothly a spring 15 placed on the spindle 5 is interposed between the boss of the nut 3 and the base 10.

The two halves or portions of the nut instead of being pivoted below the screw and formed after the manner of a pair of pliers may be hinged or pivoted above the screw, the operation and action being in each case the same. The nut 3 can be of any desired length and the corners of each half or portion are removed as at 15[A], so that the nut 3 disengages from the screw 1 with a minimum amount of movement.

Having now described our invention what we claim as new and desire to secure by Letters Patent is:—

1. In a vise, in combination, a stationary member, a slidable member, a screw acting between said members for operating the slidable member, a pair of crossed and pivoted arms carried by said stationary member but capable of movement relatively thereto and having nut sections thereon for embracing said screw, said arms and stationary member interacting so as to either lock or release the nut sections when the crossed and pivoted arms are moved toward or away from the stationary member by the manipulation of said screw, and a bar journaled in said slidable member and passing between said pivoted arms for actuating the same, as set forth.

2. In a vise, in combination, a stationary member, a slidable member, a screw acting between said members for operating the slidable member, a pair of crossed and pivoted arms carried by said stationary member but capable of movement relatively thereto and having nut sections thereon for embracing said screw, said arms and stationary member interacting so as to either lock or release the nut sections when the crossed and pivoted arms are moved toward or away from the stationary member by the manipulation of said screw, a spring for holding said nut sections in their closed position, and an eccentrically pivoted rectangular bar for opening said nut sections at equal rates, as set forth.

3. In a vise, in combination, a stationary member, a slidable member, a screw acting between said members for operating the slidable member, a stud upon said stationary member, a pair of crossed and pivoted arms supported by said stud but capable of longitudinal movement thereon, nut sections upon said arms for engaging said screw, said arms and stationary member interacting so as to either lock or release the nut sections when the crossed and pivoted arms are moved toward or away from the stationary member by the manipulation of said screw, a spring surrounding said stud and acting to move said pivoted arms away from said stationary member, springs for holding said nut sections in their closed position, and a bar journaled in said slidable member and passing between said pivoted arms for actuating the same, as set forth.

4. In a vise, in combination, a stationary member, a slidable member, a screw acting between said members for operating the slidable member, a stud upon said stationary member, a pair of crossed and pivoted arms fulcrumed about said stud and capable also of longitudinal movement thereon, a spring surrounding said stud and forcing said arms away from the stationary member, a stop upon said stud for limiting the movement of said arms under the action of said spring, nut sections upon said arms for engaging said screw, said arms and stationary member interacting so as to either positively lock or release the nut sections when the crossed and pivoted arms are moved toward or away from the stationary member by the manipulation of said screw, springs for holding said nut sections in their closed position, a rectangular bar eccentrically journaled in said slidable member and passing between the ends of said crossed arms and means for partially rotating said bar, as set forth.

5. In a vise, in combination, a stationary base provided with a jaw, a hollow slide movable in said base and also provided with a jaw, said base also having a buttress portion which projects within the hollow slide, an operating screw journaled in said slide, a stud secured to said buttress portion, a pair of crossed and pivoted arms supported by, but movable longitudinally on said stud and having nut sections at their upper ends, a washer interposed between the buttress portion and said arms on the crossed arms and serving to lock said sections when the latter engage therewith, a spring pressing said crossed arms away from said washer, means for limiting the movement of said arms, under the action of said springs, springs for holding said nut sections in their closed position, a rectangular bar eccentically journaled in said slide and passing between the lower end portions of said arms, and a thumb lever for rocking said bar, as set forth.

In testimony whereof we affix our signatures, in presence of two witnesses.

RICHARD WILKINSON BATEMAN.
LOFTUS HANSON BATEMAN.

Witnesses:
ARTHUR HUGHES,
HILDA HUGHES.

Copies of this patent may be obtained for five cents each, by addressing the "Commissioner of Patents, Washington, D. C."